United States Patent
Matsuda et al.

(10) Patent No.: US 8,790,544 B2
(45) Date of Patent: *Jul. 29, 2014

(54) LIQUID-CRYSTALLINE COATING SOLUTION AND POLARIZING FILM

(75) Inventors: Shoichi Matsuda, Ibaraki (JP); Tadayuki Kameyama, Ibaraki (JP); Sadahiro Nakanishi, Ibaraki (JP); Toru Umemoto, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 23 days.

This patent is subject to a terminal disclaimer.

(21) Appl. No.: 13/381,462

(22) PCT Filed: Jul. 1, 2010

(86) PCT No.: PCT/JP2010/061241
§ 371 (c)(1),
(2), (4) Date: Dec. 29, 2011

(87) PCT Pub. No.: WO2011/004759
PCT Pub. Date: Jan. 13, 2011

(65) Prior Publication Data
US 2012/0105795 A1    May 3, 2012

(30) Foreign Application Priority Data

Jul. 10, 2009  (JP) ................. 2009-163474
Jun. 24, 2010  (JP) ................. 2010-143320

(51) Int. Cl.
| | |
|---|---|
| *C09K 19/52* | (2006.01) |
| *C09K 19/06* | (2006.01) |
| *C09K 19/32* | (2006.01) |
| *C09K 19/00* | (2006.01) |
| *B32B 9/04* | (2006.01) |
| *C09K 19/54* | (2006.01) |

(52) U.S. Cl.
USPC ........... 252/299.01; 252/299.5; 252/299.6; 252/299.62; 428/1.1; 428/1.3; 428/411.1; 349/194; 977/700; 977/773

(58) Field of Classification Search
USPC ........... 252/299.01, 299.5, 299.6, 299.62; 428/1.1, 1.3, 411.1; 349/194; 977/700, 977/773
See application file for complete search history.

(56) References Cited

U.S. PATENT DOCUMENTS

| | | | |
|---|---|---|---|
| 6,552,849 | B1 | 4/2003 | Furuhashi et al. |
| 7,527,862 | B2 | 5/2009 | Yoneyama et al. |
| 7,850,868 | B2 | 12/2010 | Matsuda et al. |
| 2006/0182902 | A1 | 8/2006 | Yoneyama et al. |
| 2009/0166583 | A1 | 7/2009 | Hasegawa et al. |
| 2010/0038589 | A1 | 2/2010 | Matsuda et al. |
| 2010/0039608 | A1 | 2/2010 | Matsuda et al. |
| 2010/0221548 | A1 | 9/2010 | Inoue et al. |
| 2011/0163268 | A1 | 7/2011 | Onouchi et al. |
| 2012/0028013 | A1 | 2/2012 | Matsuda et al. |
| 2012/0091393 | A1* | 4/2012 | Miyazaki et al. ........ 252/299.01 |

FOREIGN PATENT DOCUMENTS

| | | |
|---|---|---|
| EP | 1 906 216 | 4/2008 |
| JP | 2006-79030 A | 3/2006 |
| JP | 2009-073910 | 4/2009 |
| JP | 2010-26024 A | 2/2010 |
| TW | 1225180 | 12/2004 |
| TW | 200927837 | 7/2009 |
| WO | 2009/037911 | 3/2009 |
| WO | 2009/037911 A1 | 3/2009 |
| WO | 2009/066520 | 5/2009 |
| WO | 2009/084317 | 7/2009 |
| WO | 2009/084317 A1 | 7/2009 |

OTHER PUBLICATIONS

"International Search Report (ISR).", Application No. PCT/JP2010/061241, Sep. 21, 2010, pp. 1-2.
Yutaka Hosoda, "Theoretical production Dye Chemistry, "Riron Seizo Sentyo Kagaku" Fifth Edition", Gihodo Shuppan Co., Ltd., Jul. 15, 1968, pp. 134-153.
Machine translation and Abstract for JP-2010-026024, published on Feb. 4, 2010.
Taiwanese Office Action with English language translation thereof, mail date is Jan. 29, 2013.
Chinese Office Action with English language translation thereof, mail date is Feb. 8, 2013.
Taiwanese Office Action with English language translation, mail date is Jun. 17, 2013.
Korean Office Action issued with respect to counterpart Korean Application No. KR 2011-7004296 dated Aug. 20, 2012.

* cited by examiner

*Primary Examiner* — Geraldina Visconti
(74) *Attorney, Agent, or Firm* — Greenblum & Bernstein, P.L.C.

(57) ABSTRACT

It is possible to obtain a polarizing film having a high dichroic ratio by using a liquid-crystalline coating solution in which a small quantity of a second lyotropic liquid-crystalline low-molecular compound is mixed with a first lyotropic liquid-crystalline low-molecular compound. The second lyotropic liquid-crystalline low-molecular compound has a mole number smaller than the first lyotropic liquid-crystalline low-molecular compound. The molecular size of the second lyotropic liquid-crystalline low-molecular compound is smaller than that of the first lyotropic liquid-crystalline low-molecular compound.

17 Claims, 2 Drawing Sheets

PRIOR ART

LIQUID-CRYSTALLINE COATING SOLUTION AND POLARIZING FILM

BACKGROUND OF THE INVENTION

1. Field of the Invention

The present invention relates to a liquid-crystalline coating solution suitable for producing a polarizing film and a polarizing film made from the liquid-crystalline coating solution.

2. Description of the Related Art

Conventionally, a liquid-crystalline coating solution 30 which includes a lyotropic liquid-crystalline low-molecular compound 33 for forming a columnar aggregate 32 in a solvent 31 as shown in FIG. 3 has been known (For instance, JP 2006-079030 A).

The aforementioned lyotropic liquid-crystalline compound 33 forms the columnar aggregate 32 in the solvent 31. For instance, when the liquid-crystalline coating solution 30 is cast by flowing on a substrate with the application of shearing stress onto the liquid-crystalline coating solution 30, long axis directions (orientation directions 32a) of columnar aggregates 32 are oriented in a flow casting direction 34. This makes it possible to form a polarizing film using the liquid-crystalline coating solution 30.

In the case where the conventional liquid-crystalline coating solution 30 is used, as shown in FIG. 3, there is, however, considerable nonuniformity in orientation directions 32a of the columnar aggregates 32 after flow casting. As a result, there has been a problem of a low dichroic ratio of the obtained polarizing film.

SUMMARY OF THE INVENTION

As schematically shown in FIG. 3, in the case where the conventional liquid-crystalline coating solution 30 is used, the obtained polarizing film has had a problem of having a low dichroic ratio because there is considerable nonuniformity in the orientation direction 32a of the columnar aggregates 32 after flow casting. In contrast to this, it is an object of the present invention to provide a liquid-crystalline coating solution from which a polarizing film having a high dichroic ratio is obtainable.

The summary of the present invention is described as follows:

In a first preferred aspect, a liquid-crystalline coating solution according to the present invention comprises: a first lyotropic liquid-crystalline low-molecular compound; a second lyotropic liquid-crystalline low-molecular compound; and a solvent. The first and second lyotropic liquid-crystalline low-molecular compounds are stacked to form a columnar composite aggregate. The second lyotropic liquid-crystalline low-molecular compound has a smaller quantity than the first lyotropic liquid-crystalline low-molecular compound in number of moles. The second lyotropic liquid-crystalline low-molecular compound has a molecular size smaller than the first lyotropic liquid-crystalline low-molecular compound. The measuring method of the molecular size is described in the item of [Measuring method].

In a second preferred aspect of the liquid-crystalline coating solution according to the present invention, the first lyotropic liquid-crystalline low-molecular compound has a molecular size of 2 nm to 4 nm.

In a third preferred aspect of the liquid-crystalline coating solution according to the present invention, the second lyotropic liquid-crystalline low-molecular compound has a molecular size of 1 nm or greater and less than 4 nm.

In a fourth preferred aspect of the liquid-crystalline coating solution according to the present invention, $M_2/M_1$ is 0.5 or more and less than 1 when $M_1$ represents the molecular size of the first lyotropic liquid-crystalline low-molecular compound and $M_2$ represents the molecular size of the second lyotropic liquid-crystalline low-molecular compound.

In a fifth preferred aspect of the liquid-crystalline coating solution according to the present invention, the first lyotropic liquid-crystalline low-molecular compound is an aromatic disazo compound.

In a sixth preferred aspect of the liquid-crystalline coating solution according to the present invention, the aromatic disazo compound is represented by the following general formula (1):

[Chemical 1]

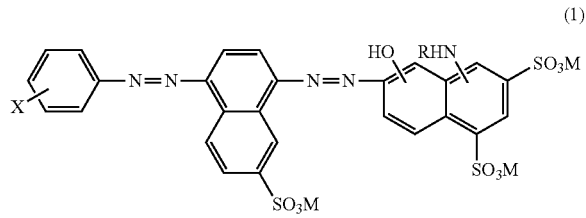

(1)

In the general formula (1), R is a hydrogen atom, an alkyl group having 1 to 3 carbon atoms, an acetyl group, a benzoyl group, or a phenyl group which may have any substituent group; M is a counterion; and X is a hydrogen atom, a halogen atom, a nitro group, a cyano group, an alkyl group having 1 to 4 carbon atoms, an alkoxy group having 1 to 4 carbon atoms or —$SO_3M$ group.

In a seventh preferred aspect of the liquid-crystalline coating solution according to the present invention, the second lyotropic liquid-crystalline low-molecular compound is an aromatic monoazo compound.

In an eighth preferred aspect of the liquid-crystalline coating solution according to the present invention, the aromatic monoazo compound is represented by the following general formula (3):

[Chemical formula 3]

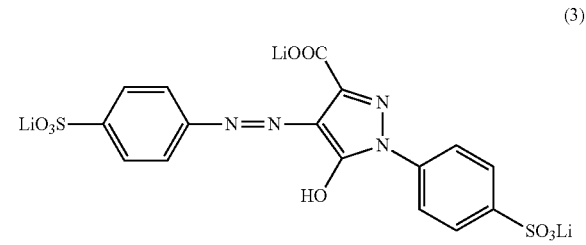

(3)

In a ninth preferred aspect, a polarizing film according to the present invention is obtained by flow casting the aforementioned liquid-crystalline coating solution in a thin film state.

Advantage of the Invention

It is possible to obtain a polarizing film with a high dichroic ratio by using a liquid-crystalline coating solution in which a small quantity of a second lyotropic liquid-crystalline low-molecular compound is mixed with a first lyotropic liquid-crystalline low-molecular compound in the solvent. The phrase "a small quantity of" means a small number of moles.

DESCRIPTION OF THE PREFERRED EMBODIMENTS

Inventors of the present invention carried out extensive investigations to solve the aforementioned problem. As a result, they found out that it was possible to obtain a polarizing film with a high dichroic ratio by using a liquid-crystalline coating solution in which a small quantity of a second lyotropic liquid-crystalline low-molecular compound is mixed with a first lyotropic liquid-crystalline low-molecular compound.

Figure 1:
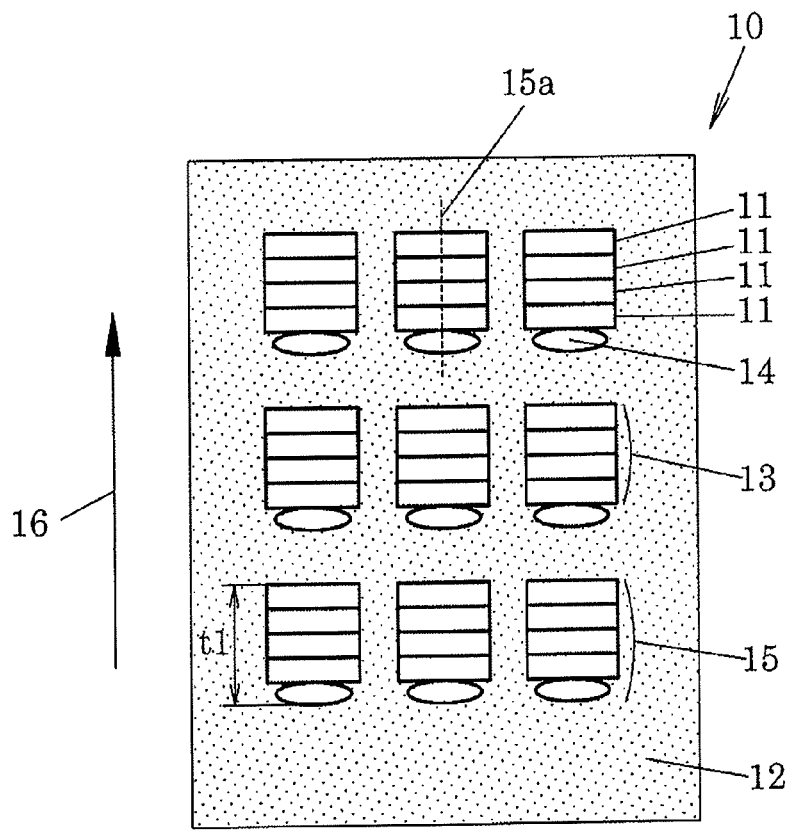
FIG. 1 is a schematic view of a liquid-crystalline coating solution of the present invention.

Referring to FIG. 1, there is illustrated a liquid-crystalline coating solution 10 of the present invention. First lyotropic liquid-crystalline low-molecular compounds 11 form a columnar aggregate 13 in a solvent 12 when not mixing a second lyotropic liquid-crystalline low-molecular compound 14.

When first lyotropic liquid-crystalline low-molecular compounds 11 and second lyotropic liquid-crystalline low-molecular compounds 14 are mixed, a large number of the first lyotropic liquid-crystalline low-molecular compounds 11 and a small quantity of the second lyotropic liquid-crystalline low-molecular compounds 14 are stacked to form relatively short columnar composite aggregates 15. The second lyotropic liquid-crystalline low-molecular compounds 14 respectively have a molecular size which is smaller than that of the first lyotropic liquid-crystalline low-molecular compounds 11.

The columnar composite aggregates 15 are oriented in a flow casting direction 16 when the liquid-crystalline coating solution 10 is flow cast onto a substrate in a thin film state to form a polarizing film. At this time, orientation directions 15a have fewer nonuniformity than conventional columnar aggregates 32. The thus obtained polarizing film has a higher dichroic ratio.

In the case where the quantity of the second lyotropic liquid-crystalline low-molecular compounds 14 is too large, the length of the columnar composite aggregates 15 is too short, so that there are fears that it may be impossible to develop liquid crystallinity in the coating solution.

Figure 2:
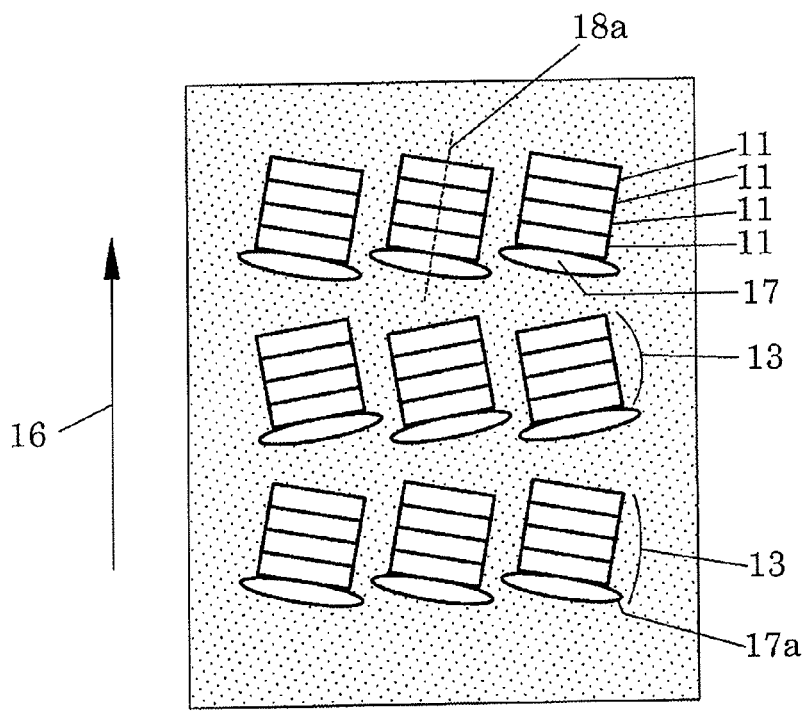
FIG. 2 is a schematic view of the liquid-crystalline coating solution beyond the scope of the present invention.
Figure 3:
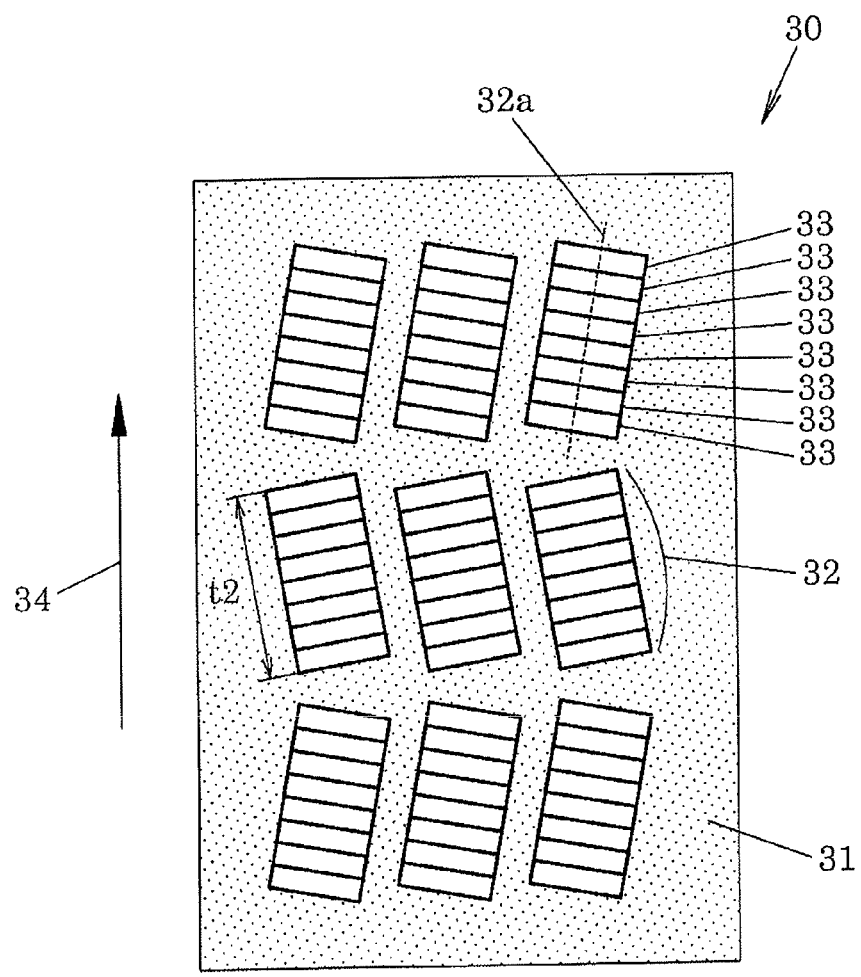
FIG. 3 is a schematic view of a conventional liquid-crystalline coating solution.

As schematically shown in FIG. 2, in the case where the molecular size of the second lyotropic liquid-crystalline low-molecular compounds 17 is greater than that of the first lyotropic liquid-crystalline low-molecular compounds 11, projections 17a are formed in a portion of columnar composite aggregates 18. This widens the nonuniformity of orientation directions 18a of the columnar composite aggregates 18, which could result in lower dichroic ratio of the polarizing film.

Accordingly, the quantity of the second lyotropic liquid-crystalline low-molecular compound 14 is needed to be less than (it means the number of moles is smaller) that of the first lyotropic liquid-crystalline low-molecular compound 11. Further, the molecular size of the second lyotropic liquid-crystalline low-molecular compound 14 is needed to be smaller than that of the first lyotropic liquid-crystalline low-molecular compound 11.

It is possible to obtain a polarizing film with a high dichroic ratio by the use of the liquid-crystalline coating solution 10 in which a small quantity of the second lyotropic liquid-crystalline low-molecular compounds 14 is mixed with the first lyotropic liquid-crystalline low-molecular compounds 11 in the solvent 12.

[Liquid-Crystalline Coating Solution]

A liquid-crystalline coating solution 10 of the present invention comprises: a first lyotropic liquid-crystalline low-molecular compound 11; a second lyotropic liquid-crystalline low-molecular compound 14 whose quantity is less than the first lyotropic liquid-crystalline low-molecular compound 11; and a solvent 12.

When the first lyotropic liquid-crystalline low-molecular compound 11 is not mixed with the second lyotropic liquid-crystalline low-molecular compound 14, a columnar aggregate 13 is formed in the solvent 12.

In the case where the first lyotropic liquid-crystalline low-molecular compound 11 and the second lyotropic liquid-crystalline low-molecular compound 14 are mixed in the solvent 12, a columnar composite aggregate 15 is formed. The columnar composite aggregate 15 is presumed to be formed by stacking a large number of first lyotropic liquid-crystalline low-molecular compounds 11 with a small number of second lyotropic liquid-crystalline low-molecular compounds 14. The molecular size of the second lyotropic liquid-crystalline low-molecular compound 14 is smaller than the molecular size of the first lyotropic liquid-crystalline low-molecular compound 11.

A length $t_1$ of the columnar composite aggregate 15 determined by X-ray diffraction is shorter than a length $t_2$ (for instance, 10 nm) of the columnar aggregate 32 formed by only first lyotropic liquid-crystalline low-molecular compounds 33, and is preferably 5 nm to 9 nm.

There are fears that the coating solution may not develop liquid crystallinity when the length $t_1$ of the columnar composite aggregate 15 is less than 5 nm. When the length $t_1$ of the columnar composite aggregate 15 is over 10 nm, there may be greater nonuniformity in orientation directions, which may result in lower dichroic ratio of the polarizing film.

The liquid-crystalline coating solution 10 of the present invention may include an additive. Examples of the additive typically include a surfactant and an antioxidant. The content of the additive is preferably 5% by weight or lower relative to the total weight of the liquid-crystalline coating solution 10.

The liquid-crystalline coating solution 10 of the present invention preferably has a total dissolved solid concentration of 0.5% by weight to 50% by weight.

The liquid-crystalline coating solution 10 of the present invention preferably exhibits a liquid-crystalline phase at least partially in the aforementioned concentration range. The liquid-crystalline phase that the liquid-crystalline coating solution 10 exhibits is not particularly limited, but examples of the liquid-crystalline phase include a nematic liquid-crystalline phase, a hexagonal liquid-crystalline phase or the like. These liquid-crystalline phases can be identified and confirmed by observing optical patterns with a polarization microscope.

[First Lyotropic Liquid-Crystalline Low-Molecular Compound]

The first lyotropic liquid-crystalline low-molecular compounds 11 to be used in the present invention independently form a columnar aggregate 13 in a state where molecules are stacked in the solvent 12.

The molecule weight of the first lyotropic liquid-crystalline low-molecular compound 11 is preferably 700 to 750 as the state of a free acid. The molecular size of the first lyotropic liquid-crystalline low-molecular compound 11 is preferably 2 nm to 4 nm and further preferably 2 nm to 3 nm.

Examples of the first lyotropic liquid-crystalline low-molecular compound 11 typically include an aromatic disazo compound. Such an aromatic disazo compound is preferably represented by the general formula (1): The aromatic disazo compound represented by the general formula (1) exhibits stable liquid crystallinity in the solvent and has superior orientation.

[Chemical formula 1]

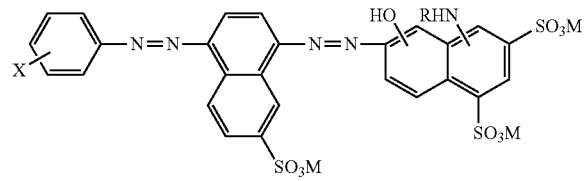

(1)

In the general formula (1), R is a hydrogen atom, an alkyl group having 1 to 3 carbon atoms, an acetyl group, a benzoyl group, or a phenyl group which may have any substituent group; M is a counterion and is preferably a hydrogen atom, an alkali metal atom or an alkali earth metal atom; and X is a hydrogen atom, a halogen atom, a nitro group, a cyano group, an alkyl group having 1 to 4 carbon atoms, an alkoxy group having 1 to 4 carbon atoms or —$SO_3M$ group.

An aromatic disazo compound is produced by diazotizing and coupling an aniline derivative and a naphthalenesulfonate derivative in accordance with a conventional method and the obtained monoazo compound is subject to diazotization and coupling reaction with amino naphthol disulfonate derivative to obtain an aromatic disazo compound represented by the general formula (1).

[Second Lyotropic Liquid-Crystalline Low-Molecular Compound]

The molecular size of the second lyotropic liquid-crystalline low-molecular compound 14 is smaller than that of the first lyotropic liquid-crystalline low-molecular compound 11. The molecular size of the second lyotropic liquid-crystalline low-molecular compound 14 is preferably 1 nm or greater and less than 4 nm, more preferably 1.5 nm to 1.8 nm.

When the molecular size of the second lyotropic liquid-crystalline low-molecular compound 14 is less than 1 nm, the second lyotropic liquid-crystalline low-molecular compound 14 itself loses liquid crystallinity, which may make it difficult to be coupled to the columnar aggregate 13 formed by a plurality of first lyotropic liquid-crystalline low-molecular compounds 11.

When the molecular size of the second lyotropic liquid-crystalline low-molecular compound 14 is over 4 nm, there are fears that the columnar composite aggregates 15 formed by the first lyotropic liquid-crystalline low-molecular compounds 11 may not be uniformly oriented.

When $M_1$ is the molecular size of the first lyotropic liquid-crystalline low-molecular compound 11 and $M_2$ is the molecular size of the second lyotropic liquid-crystalline low-molecular compound 14, $M_2/M_1$ is preferably 0.5 or greater and less than 1, more preferably 0.6 to 0.9. In the case where the molecular size has such a rate, there is little nonuniformity in orientation directions of the columnar composite aggregates 15.

The second lyotropic liquid-crystalline low-molecular compound 14 preferably has a molecular weight of 300 to 500 in the state of a free acid.

Typical examples of the second lyotropic liquid-crystalline low-molecular compound 14 satisfying the aforementioned features include aromatic monoazo compounds. Examples of such aromatic monoazo compounds include Acid Yellow 23 (Food Yellow No. 4) or derivatives thereof, alternatively, Sunset Yellow FCF or derivatives thereof.

The content of the second lyotropic liquid-crystalline low-molecular compound 14 is smaller than that of the first lyotropic liquid-crystalline low-molecular compound 11 in the liquid-crystalline coating solution 10. The content of the second lyotropic liquid-crystalline low-molecular compound 14 is preferably 1 mole to 30 moles relative to 100 moles of the first lyotropic liquid-crystalline low-molecular compound 11.

[Solvent]

A solvent 12 to be used in the present invention dissolves the first lyotropic liquid-crystalline low-molecular compound 11 and the second lyotropic liquid-crystalline low-molecular compound 14. The solvent 12 is preferably a hydrophilic solvent. Examples of the hydrophilic solvent include water, alcohol kinds, cellosolve kinds and mixture thereof.

[Polarizing Film]

A polarizing film obtained by cast flowing the liquid-crystalline coating solution 10 of the present invention preferably exhibits absorption dichroism in a visible light region (at a wavelength of 380 nm to 800 nm) at least one wavelength. The polarizing film obtained from the liquid-crystalline coating solution 10 of the present invention preferably has a dichroic ratio of 40 or greater.

The polarizing film obtained by flow casting the liquid-crystalline coating solution 10 preferably has thickness of 0.1 μm to 5 μm, further preferably 0.1 μm to 3 μm.

Examples

The present invention will be more clearly understood by referring to the Examples below. However, the Examples should not be construed to limit the invention in any way.

Synthetic Example 1

In accordance with a conventional method ("Riron Seizo Senryo Kagaku" Fifth Edition (Theoretical production Dye Chemistry), Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid.

The obtained monoazo compound was diazotized by a conventional method in the same manner and was further subject to coupling reaction with 1-amino-8-naphthol-2,4-disulfonate lithium salt to obtain a crude product including an aromatic disazo compound having the following structural formula (2) and salting out was carried out with lithium chloride to obtain an aromatic disazo compound having the following structural formula (2) (hereinafter referred to as a compound (2)):

[Chemical formula 2]

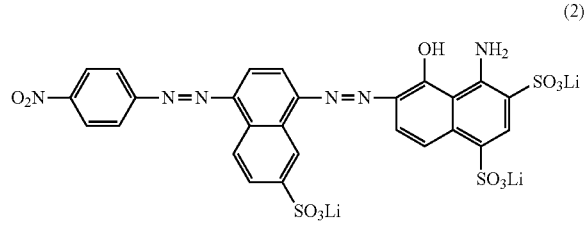

(2)

The compound (2) was dissolved in ion-exchange water to prepare an aqueous solution of 20% by weight. The aqueous solution was obtained with a polyethylene dropper and was sandwiched by two microscope slides. A nematic liquid-crystalline phase was observed when observing with a polarization microscope at room temperature (23° C.).

Synthetic Example 2

Food Yellow No. 4 (sodium salt) (manufactured by Tokyo Chemical Industry Co., Ltd.) was diluted using ion-exchange water to prepare an aqueous solution having a concentration of 1% by weight. The aqueous solution was passed through a cation ion-exchange resin and then was neutralized with a lithium hydroxide aqueous solution so as to be pH=7.0.

An aromatic monoazo compound represented by the following structural formula (3) was obtained by being solidified after concentration (Food Yellow No. 4 lithium salt): molecular size: 1.73 nm; molecular weight: 486.22 (hereinafter referred to as a compound (3)). The compound (3) was dissolved in ion-exchange water to prepare an aqueous solution of 25% by weight.

[Chemical formula 3]

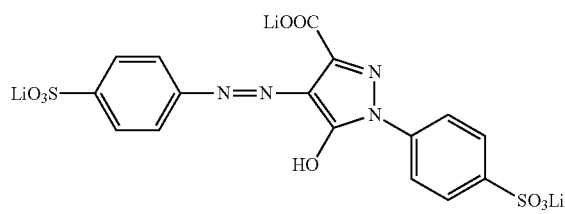

(3)

This aqueous solution was taken by a polyethylene dropper and was sandwiched by two microscope slides. A nematic liquid-crystalline phase was observed when observing with a polarization microscope at room temperature (23° C.).

Synthetic Example 3

8-Amino-2-naphthalene sulfonic acid and 1-amino-8-naphthol-2,4-disulfonate lithium salt were subject to diazotization and coupling reaction in accordance to obtain a crude product including a monoazo compound having the following structural formula (4) and salting out was carried out with lithium chloride to obtain an aromatic monoazo compound having the following structural formula (4)(molecular size: 1.46 nm, molecular weight: 571.34; hereinafter referred to as a compound (4)):

[Chemical formula 4]

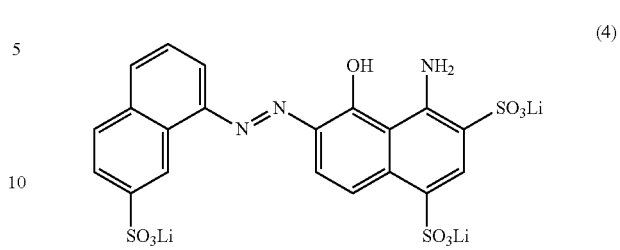

(4)

The compound (4) was dissolved in ion-exchange water to prepare an aqueous solution of 30% by weight. The aqueous solution was obtained with a polyethylene dropper and was sandwiched by two microscope slides. A nematic liquid-crystalline phase was observed when observing with a polarization microscope at room temperature (23° C.).

Synthetic Example 4

An Acid Red 26 lithium salt (molecular size: 1.33 nm, molecular weight: 448.33; hereinafter referred to as a compound (5)) of the following structural formula (5) was obtained in the same manner as in Synthetic Example 2 except for changing Food Yellow No. 4 to Acid Red 26 (manufactured by Tokyo Chemical Co., Ltd.).

[Chemical formula 5]

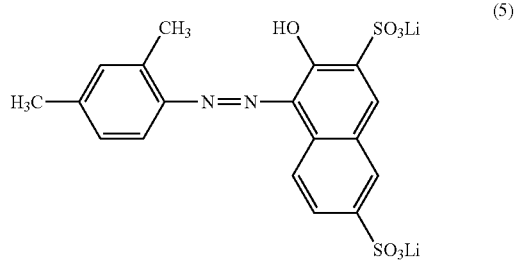

(5)

The compound (5) was dissolved in ion-exchange water to prepare an aqueous solution of 30% by weight. The solution was obtained with a polyethylene dropper and was sandwiched by two microscope slides. A nematic liquid-crystalline phase was observed when observing with a polarization microscope at room temperature (23° C.).

Synthetic Example 5

An Acid Red 27 lithium salt (molecular size: 1.45 nm, molecular weight: 556.33; hereinafter referred to as a compound (6)) of the following structural formula (6) was obtained in the same manner as in Synthetic Example 2 except for changing Food Yellow No. 4 to Acid Red 27 (manufactured by Tokyo Chemical Co., Ltd.).

[Chemical formula 6]

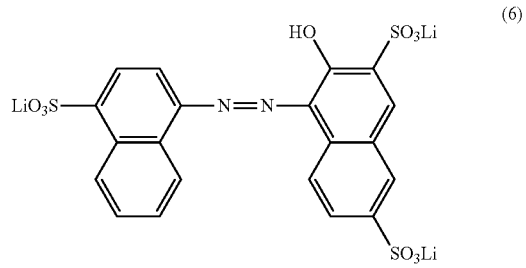

(6)

The compound (6) was dissolved in ion-exchange water to prepare an aqueous solution of 30% by weight. The solution was obtained with a polyethylene dropper and was sandwiched by two microscope slides. A nematic liquid-crystalline phase was observed when observing with a polarization microscope at room temperature (23° C.).

Synthetic Example 6

A Mordant Green 28 lithium salt (molecular size: 1.48 nm, molecular weight: 485.73; hereinafter referred to as a compound (7)) of the following structural formula (7) was obtained in the same manner as in Synthetic Example 2 except for changing Food Yellow No. 4 to Mordant Green 28 (manufactured by Yamada Chemical Co., Ltd.).

[Chemical formula 7]

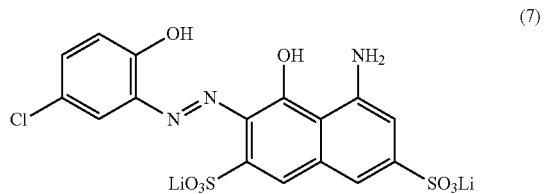

(7)

The compound (7) was dissolved in ion-exchange water to prepare an aqueous solution of 15% by weight. The solution was obtained with a polyethylene dropper and was sandwiched by two microscope slides. A nematic liquid-crystalline phase was observed when observing with a polarization microscope at room temperature (23° C.).

Example 1

The compound (2) (molecular size: 2.16 nm) was dissolved in ion-exchange water to prepare an aqueous solution with a concentration of 1% by weight. The compound (2) corresponds to the first lyotropic liquid-crystalline low-molecular compound. The compound (3) (molecular size: 1.73 nm) was dissolved in ion-exchange water to prepare an aqueous solution with a concentration of 1% by weight. The compound (3) corresponds to the second lyotropic liquid-crystalline low-molecular compound. These aqueous solutions were mixed so that the mixing ratio (molar ratio) of the compound (2) and the compound (3) may be 98:2. Subsequently, a specific quantity of water was removed to prepare the aqueous solution so that the total dissolved solid concentration might be 20% by weight. The aqueous solution was obtained with a polyethylene dropper and was sandwiched by two microscope slides. A nematic liquid-crystalline phase was observed when observing with a polarization microscope at room temperature (23° C.).

The aforementioned solution was diluted using ion-exchange water to prepare a coating solution of 5% by weight. The coating solution was applied onto a rubbing treated and corona treated norbornene-based polymer film (produced by Nippon Zeon Co., Ltd.) using a bar coater (produced by BUSCHMAN; product name: Mayerrot HS5) to obtain a polarizing film by natural drying in a temperature-controlled room at 23° C. Optical characteristics of the obtained polarizing film are indicated in Table 1.

Example 2

A polarizing film was obtained in the same manner as in Example 1 except that the mixing ratio (molar ratio) of the compound (2) and the compound (3) in Example 1 was set at 90:10. Optical characteristics of the obtained polarizing film are indicated in Table 1.

Example 3

A polarizing film was obtained in the same manner as in Example 1 except that the compound (3) in Example 1 was changed to the compound (4) and the mixing ratio (molar ratio) was set at 85:15. Optical characteristics of the obtained polarizing film are indicated in Table 1.

Example 4

The aqueous solution was prepared so that the total dissolved solid concentration might be 20% by weight in the aqueous solution and a nematic liquid-crystalline phase was confirmed in the same manner as in Example 1 except that the compound (3) in Example 1 was changed to the compound (5) and the mixing ratio (molar ratio) was set at 95:5. The aqueous solution was diluted using ion-exchange water so as to be 8% by weight to prepare a coating solution. And Mayerrot HS4 produced by BUSCHMAN was used as a bar coater. A polarizing film was prepared in the same manner as in Example 1 except for the above. Optical characteristics of the obtained polarizing film are indicated in Table 1.

Example 5

The aqueous solution was prepared so that the total dissolved solid concentration might be 20% by weight and a nematic liquid-crystalline phase was confirmed in the same manner as in Example 1 except that the compound (3) in Example 1 was changed to the compound (6) and the mixing ratio (molar ratio) was set at 96:4. The aqueous solution was diluted using ion-exchange water so as to be 8% by weight to prepare a coating solution. And Mayerrot HS4 produced by BUSCHMAN was used as a bar coater. A polarizing film was prepared in the same manner as in Example 1 except the above. Optical characteristics of the obtained polarizing film are indicated in Table 1.

Example 6

The aqueous solution was prepared so that the total dissolved solid concentration might be 20% by weight and a nematic liquid-crystalline phase was confirmed in the same manner as in Example 1 except that the compound (3) in Example 1 was changed to the compound (7) and the mixing ratio (molar ratio) was set at 97:3. The aqueous solution was diluted using ion-exchange water so as to be 8% by weight to prepare a coating solution. And Mayerrot HS3 produced by BUSCHMAN was used as a bar coater. A polarizing film was prepared in the same manner as in Example 1 except the above. Optical characteristics of the obtained polarizing film are indicated in Table 1.

Synthetic Example 7

A perylenetetracarboxylic benzimidazole derivative was dissolved in a-20% fuming sulfuric acid to introduce sulfonic acid after agitating for 7 hours at 110° C. This solution was added dropwise while this solution was cooled in ion-exchange water. The precipitated compound was filtrated by absorption and was dissolved in ion-exchange water to isolate inorganic acid by dialyzing. The thus obtained aqueous solution was neutralized so as to be pH=7 using a hydroxide lithium aqueous solution. This was solidified after being concentrated to obtain a perylenetetracarboxylic benzimidazole disulfonic acid lithium salt of the following structural formula (8) (molecular weight 708.54; hereinafter referred to as a compound (8)):

[Chemical formula 8]

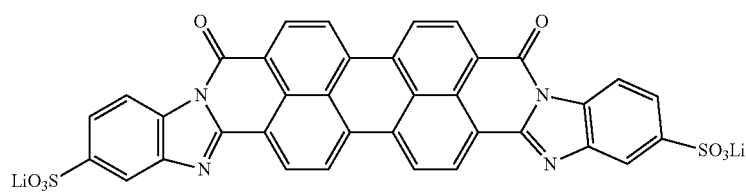

(8)

The compound (8) was dissolved in ion-exchange water to prepare an aqueous solution of 15% by weight. The aqueous solution was obtained with a polyethylene dropper and was sandwiched by two microscope slides. A nematic liquid-crystalline phase was observed when observing with a polarization microscope at room temperature (23° C.).

Comparative Example 1

A polarizing film was prepared in the same manner as in Example 1 except for not mixing the compound (3) in Example 1. Optical characteristics of the obtained polarizing film are indicated in Table 1.

Comparative Example 2

A polarizing film was obtained in the same manner as in Example 1 except that the compound (3) in Example 1 was changed to the compound (4) (molecular size: 2.41 nm) and the mixing ratio (molar ratio) was set at 98:2. Optical characteristics of the obtained polarizing film are indicated in Table 1.

Comparative Example 3

A polarizing film was obtained in the same manner as in Example 1 except that the mixing ratio (molar ratio) between the compound (2) and the compound (4) in Comparative Example 2 was set at 90:10. Optical characteristics of the obtained polarizing film are indicated in Table 1.

TABLE 1

|  | Molecular size of a first lyotropic liquid-crystalline low-molecular compound (nm) | Molecular size of a second lyotropic liquid-crystalline low-molecular compound (nm) | Mixing ratio first/second (molar ratio) | Dichroic ratio of a polarizing film |
|---|---|---|---|---|
| Example 1 | 2.16 | 1.73 | 98:2 | 45.7 |
| Example 2 | 2.16 | 1.73 | 90:10 | 45.9 |
| Example 3 | 2.16 | 1.46 | 85:15 | 49.0 |
| Example 4 | 2.16 | 1.33 | 95:5 | 45.5 |
| Example 5 | 2.16 | 1.45 | 96:4 | 45.5 |
| Example 6 | 2.16 | 1.48 | 97:3 | 47.6 |
| Comparative Example 1 | 2.16 | Nil | — | 38.0 |
| Comparative Example 2 | 2.16 | 2.41 | 98:2 | 35.4 |
| Comparative Example 3 | 2.16 | 2.41 | 90:10 | 31.7 |

[Measurement Method]

[Thickness]

A portion of a polarizing film was released to obtain the thickness of the polarizing film by measuring the level difference using a three-dimensional measurement system of the shape of a non-contact surface (manufactured by Ryoka Systems, Inc., product name: "MM5200").

[Liquid-Crystalline Phase]

A small quantity of the coating solution was sandwiched by two microscope slides to observe a liquid-crystalline phase using a polarization microscope (manufactured by Olympus, product name: "OPTIPHOT-POL") with a large-size sample heating and cooling stage (manufactured by Japan High Tech Co., Ltd., product name: "10013L").

[Dichroic Ratio]

Polarization transmission spectra $K_1$ and $K_2$ were measured using a spectrophotometer (manufactured by JASCO Corporation, product name: V-7100). $K_1$ is a transmission spectrum when entering polarized light of an electrolytic vector parallel to a transmission axis of a polarizing film and $K_2$ is a transmission spectrum when entering polarized light of an electrolytic vector perpendicular to a transmission axis of a polarizing film. The measured wavelength was set at 380 nm to 780 nm. In view of surface reflection of the base material, a dichroic ratio of the polarizing film was calculated using $Y_1$ and $Y_2$ in which visibility amendment was performed from this spectrum to obtain a dichroic ratio of the polarizing film from an equation: Dichroic ratio=log $(0.92/Y_2)$/log $(0.92/Y_1)$.

[Molecular Size]

A structural optimization calculation was performed with a MOPAC equipped with general-purpose molecular modeling program "CS Chem 3D Pro 5" manufactured by Cambridge Soft Corporation. In the structure, the most separated distance between two atoms out of atoms except for a hydrogen atom was taken as molecular size.

INDUSTRIAL APPLICABILITY

The uses of the polarizing film obtained from the liquid-crystalline coating solution of the present invention are not particularly limited, but the polarizing film is preferably used for liquid crystal panels for a variety of devices, such as liquid crystal television units, computer displays, mobile phones, portable game devices, digital cameras, video cameras, car navigation systems, office automation appliances, factory automation.

DESCRIPTION OF THE REFERENCE NUMERALS

10: liquid-crystalline coating solution; 11: first lyotropic liquid-crystalline low-molecular compound; 12: solvent; 13: columnar aggregate; 14: second lyotropic liquid-crystalline low-molecular compound; 15: columnar composite aggregate; 15a: orientation direction; 16: flow casting direction; 17: second lyotropic liquid-crystalline low-molecular compound; 17a: Projection; 18: columnar composite aggregate; 18a: orientation direction; 30: liquid-crystalline coating solution; 31: solvent; 32: columnar aggregate; 32a: orientation direction; 33: lyotropic liquid-crystalline low-molecular compound; 34: flow casting direction

What is claimed is:

1. A liquid-crystalline coating solution comprising:
   a first lyotropic liquid-crystalline compound;
   a second lyotropic liquid-crystalline compound; and
   a solvent,
   wherein the first and second lyotropic liquid-crystalline compounds are stacked to form a columnar composite aggregate,
   wherein the second lyotropic liquid-crystalline compound has a smaller molecular weight than the first lyotropic liquid-crystalline compound, and
   wherein the second lyotropic liquid-crystalline compound has a smaller quantity than the first lyotropic liquid-crystalline compound, and
   further wherein the second lyotropic liquid-crystalline compound has a molecular size smaller than the first lyotropic liquid-crystalline compound.

2. The liquid-crystalline coating solution according to claim 1, wherein the first lyotropic liquid-crystalline compound has a molecular size of 2 nm to 4 nm.

3. The liquid-crystalline coating solution according to claim 1, wherein the second lyotropic liquid-crystalline compound has a molecular size of 1 nm or greater and less than 4 nm.

4. The liquid-crystalline coating solution according to claim 1, wherein $M_2/M_1$ is 0.5 or more and less than 1 when $M_1$ represents the molecular size of the first lyotropic liquid-crystalline compound and $M_2$ represents the molecular size of the second lyotropic liquid-crystalline compound.

5. The liquid-crystalline coating solution according to claim 1, wherein the first lyotropic liquid-crystalline compound is an aromatic disazo compound.

6. The liquid-crystalline coating solution according to claim 5, wherein the aromatic disazo compound is represented by the following general formula (1):

[Chemical 1]

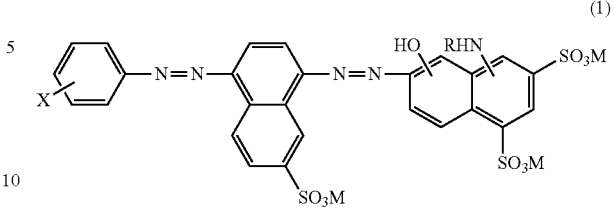

(1)

wherein R is a hydrogen atom, an alkyl group having 1 to 3 carbon atoms, an acetyl group, a benzoyl group, or a phenyl group which optionally has any substituent group; M is a counterion; and X is a hydrogen atom, a halogen atom, a nitro group, a cyano group, an alkyl group having 1 to 4 carbon atoms, an alkoxy group having 1 to 4 carbon atoms or $-SO_3M$ group.

7. The liquid-crystalline coating solution according to claim 1, wherein the second lyotropic liquid-crystalline compound is an aromatic monoazo compound.

8. The liquid-crystalline coating solution according to claim 5, wherein the second lyotropic liquid-crystalline compound is an aromatic monoazo compound.

9. The liquid-crystalline coating solution according to claim 7, wherein the aromatic monoazo compound is represented by the following general formula (3):

[Chemical formula 3]

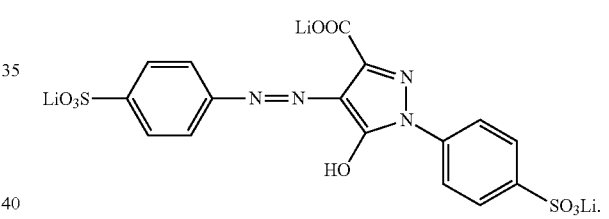

(3)

10. A polarizing film obtained by flow casting the liquid-crystalline coating solution according to claim 1 in a thin film state.

11. A polarizing film obtained by flow casting the liquid-crystalline coating solution according to claim 3 in a thin film state.

12. A polarizing film obtained by flow casting the liquid-crystalline coating solution according to claim 4 in a thin film state.

13. A polarizing film obtained by flow casting the liquid-crystalline coating solution according to claim 5 in a thin film state.

14. A polarizing film obtained by flow casting the liquid-crystalline coating solution according to claim 6 in a thin film state.

15. A polarizing film obtained by flow casting the liquid-crystalline coating solution according to claim 7 in a thin film state.

16. A polarizing film obtained by flow casting the liquid-crystalline coating solution according to claim 8 in a thin film state.

17. A polarizing film obtained by flow casting the liquid-crystalline coating solution according to claim 9 in a thin film state.

* * * * *